United States Patent [19]
Berg et al.

[11] Patent Number: 6,027,143
[45] Date of Patent: Feb. 22, 2000

[54] PLUG CONNECTION FOR PRESSURE SYSTEMS

[75] Inventors: Manfred Berg; Harald Hagen, both of Wipperfürth; Volker Kaminski, Halver, all of Germany

[73] Assignee: Armaturenfabrik Hermann Voss GmbH + Co., Germany

[21] Appl. No.: 08/864,589

[22] Filed: May 28, 1997

[30]  Foreign Application Priority Data

May 29, 1996 [DE] Germany ............................ 196 21 535

[51] Int. Cl.⁷ ........................................... F16L 35/00
[52] U.S. Cl. ....................... 285/93; 285/305; 285/321; 285/924
[58] Field of Search .................... 285/924, 305, 285/321, 93

[56] References Cited

U.S. PATENT DOCUMENTS

| | | | |
|---|---|---|---|
| 3,453,005 | 7/1969 | Foults | 285/924 X |
| 3,584,902 | 6/1971 | Vyse | 285/924 X |
| 3,929,357 | 12/1975 | DeVincent et al. | 285/924 X |
| 4,723,796 | 2/1988 | Nattel | 285/305 |

FOREIGN PATENT DOCUMENTS

| | | |
|---|---|---|
| 0 751 331 A1 | 1/1997 | European Pat. Off. . |
| 0 766 033 A1 | 4/1997 | European Pat. Off. . |
| 1.503.989 | 2/1968 | France . |
| 714028 | 8/1954 | United Kingdom ............. 285/93 |
| 867749 | 5/1961 | United Kingdom ............. 285/93 |

Primary Examiner—Dave W. Arola
Attorney, Agent, or Firm—Jones & Askew

[57]  ABSTRACT

Figures 1A, 1B:
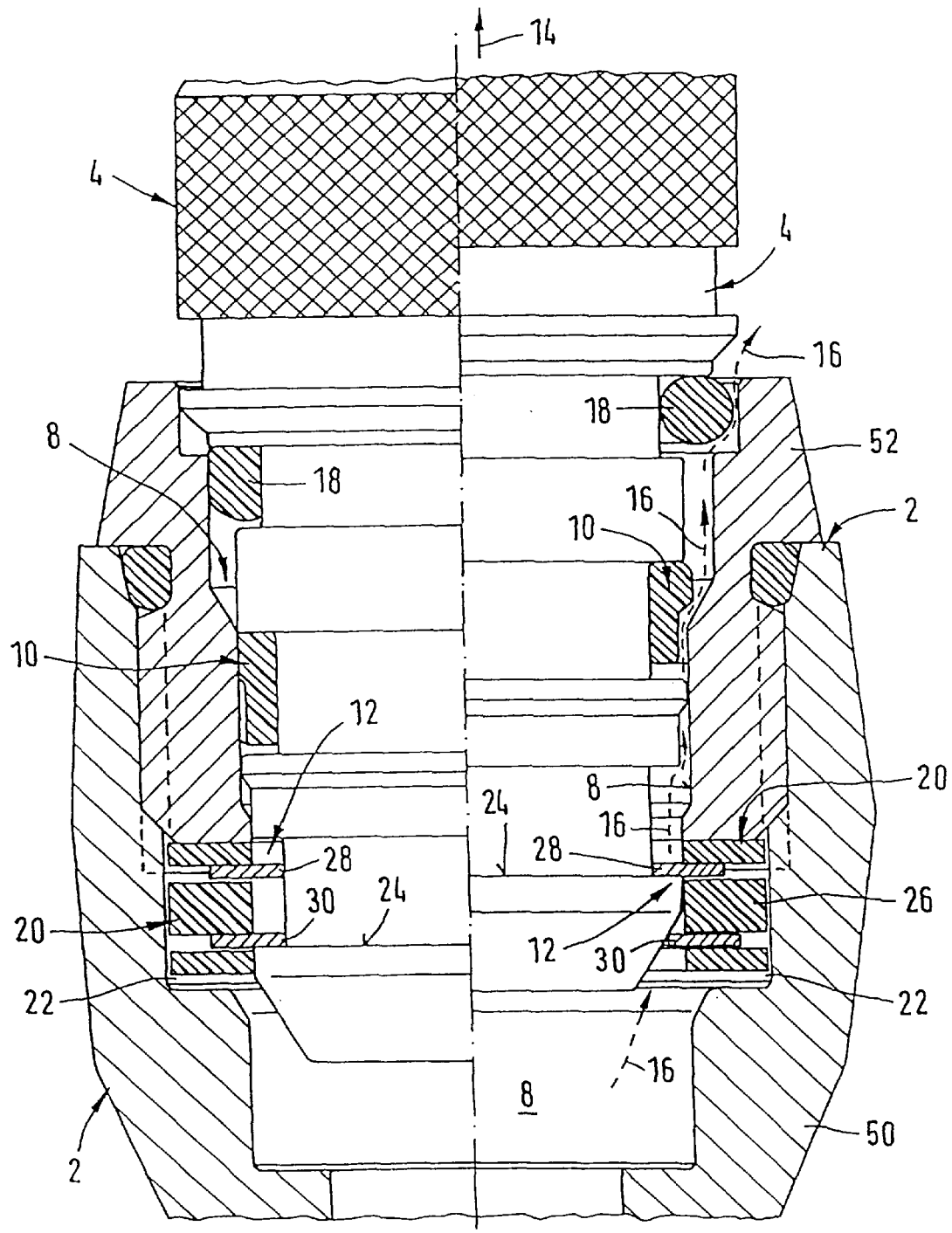

The invention pertains to a plug connection for pressure systems which consists of two coupling parts, namely a receptacle part (2) and a plug part (4). The plug part (4) can be inserted into a receptacle opening (8) of the receptacle part (2) with a plug shaft (6) such that it is circumferentially sealed and blocked from being separated by a locking device (12). The locking device (12) is realized in such a way that a partially plugged prelocking position (FIG. 1b) and an entirely plugged full locking position (FIG. 1a) are ensured. In the prelocking position, an incomplete seal is produced such that a signal, preferably an acoustically perceivable leakage noise, is generated if the plug connection is charged with pressure. A complete, pressure-tight seal is produced in the full locking position. The locking device (12) comprises a holding element (20) that is situated in a recess (22) of one coupling part (2) and realized in such a way that it respectively engages behind the same locking edge (24) of the other locking part (4) in the prelocking position (FIG. 1b) as well as in the full locking position (FIG. 1a).

10 Claims, 4 Drawing Sheets

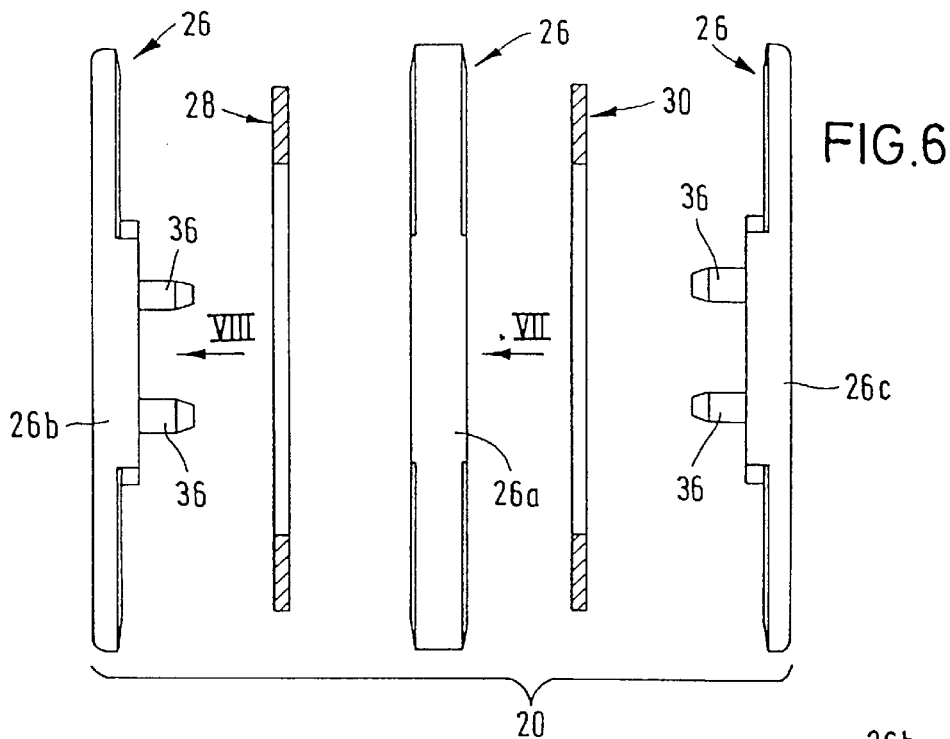
FIG.6
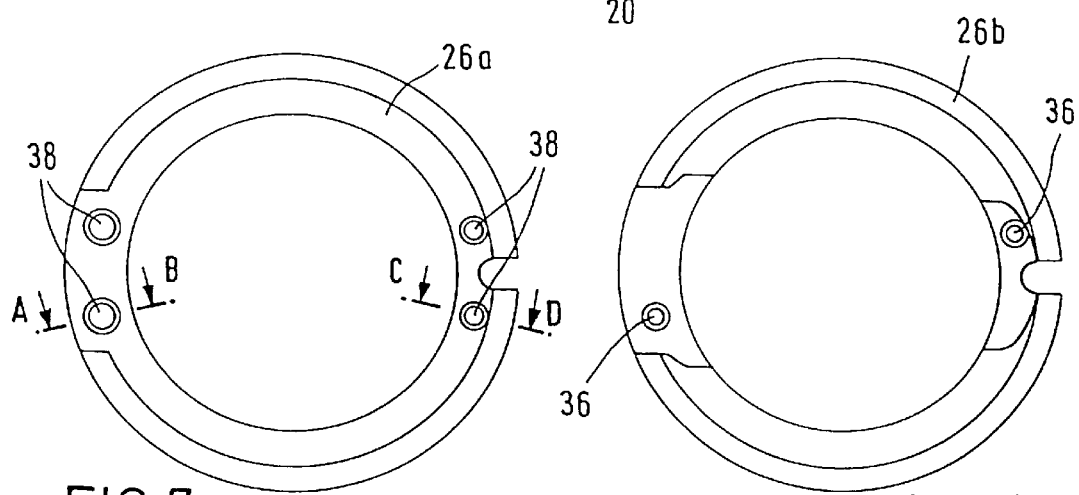
FIG.7
FIG.8
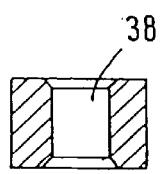
FIG.9
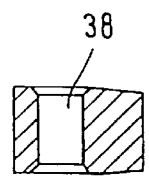
FIG.10

PLUG CONNECTION FOR PRESSURE SYSTEMS

The present invention pertains to a plug connection for pressure systems which consists of two coupling parts, namely a receptacle part and a plug part, wherein the plug part can be inserted into a receptacle opening of the receptacle part such that its plug shaft is circumferentially sealed and blocked from being released by means of a locking device, wherein the locking device is realized in such a way that a partially plugged prelocking position and an entirely plugged full locking position are ensured, wherein the prelocking position produces an incomplete seal such that a signal, in particular, an acoustically perceivable leakage noise, is generated if the connection is charged with a pressure medium, wherein a completely pressure-tight seal is produced in the full locking position, and wherein the locking device comprises a holding element that is situated in a recess of one coupling part and respectively engages behind a locking edge of the other coupling part in the prelocking position as well as in the full locking position.

Plug connections of this type are, for example, used in brake systems for motor vehicles, in particular, in compressed air brake systems for trucks. In this case—but naturally not only in this case—it is considered problematic that the assembly personnel does not pay sufficient attention to a correct and complete plug connection, e.g., in case of unfavorable space conditions or installation situations. Consequently, it is necessary to carry out test procedures so as to prevent the coupling from suddenly and unintentionally separating once the pressure is built up.

EP-B-0,226,689 discloses a "coupling device" of this type. In order to eliminate the aforementioned problem, a "prelocking" position of the coupling is ensured if a complete plug connection between the coupling parts is not produced. This prelocking position prevents the coupling from entirely separating once it is charged with pressure. In this prelocking position, the plug connection is not pressure-tight, so that this condition can be acoustically perceived in the form of a leakage noise and a complete and sudden pressure drop cannot occur. Once the leakage noise is perceived, the coupling can be additionally connected into the correctly sealed and blocked "full locking position." This known coupling device comprises a locking ring that consists of a bent spring wire of circular cross section and is realized similar to a wire snap ring. According to a first embodiment, this locking ring is arranged in a recess of the housing part that is referred to as the "nut part" in this publication. In order to realize the prelocking position and the full locking position, this locking ring successively cooperates with two separate locking edges that are formed by two annular, groove-shaped recesses of the plug part that is referred to as the "counterpart" in this publication. According to a second embodiment, the locking ring is arranged on the plug (counterpart) and cooperates with two locking edges that are formed by annular, groove-shaped recesses in the housing part (nut part). The two recesses or locking edges, which respectively cooperate with the locking ring and are provided in both embodiments, result in a contour that is relatively complicated to manufacture, namely because the first recess must be provided with a "slanted guide surface" in order to transfer the plug connection from the prelocking position into the full locking position.

EP-B-0,005,856 discloses an additional plug connection that, however, is not realized in accordance with the aforementioned type because it has no prelocking position. This known coupling is provided with a holding element that is arranged in the receptacle opening and positively engages behind a locking edge formed by an annular groove on the plug shaft in the (entirely) plugged and sealed position of the plug part. This plug connection has proven itself well in practical applications because it has a constructively simple design, and is inexpensive and robust due to the fact that only one holding element as well as only one locking edge or annular groove are provided. In addition, this plug connection advantageously allows a short structural length.

The present invention is based on the objective of developing a plug connection that is based on the aforementioned state of the art and characterized by a high reliability in the case of a faulty or incorrect plug connection, a structurally simple, inexpensive and robust design as well as a short, compact structural shape.

According to the invention, this objective is attained due to the fact that the holding element is realized in such a way that it respectively cooperates with only one locking edge in the prelocking position as well as in the full locking position. Due to the special design of the (only) holding element, it is ensured that (only) one locking edge is required. This locking edge is preferably formed by a radial, annular and groove-shaped recess. This results in a simple and inexpensive contour of the coupling parts which preferably correspond approximately to the coupling parts of the coupling known from EP-B-0,005,865. However, in case of an incorrect or incomplete plug connection, a subsequent separation of the plug connection and the problems resulting thereof are reliably prevented due to the prelocking effect.

With respect to structural considerations, it is proposed that the holding element consists of a carrier element that is situated in the recess of one coupling part and two locking elements that are held axially behind one another and can be elastically deformed in the carrier element such that the first locking element engages behind the locking edge of the other coupling part in the prelocking position and the second locking element engages behind the aforementioned locking edge in the full locking position. Consequently, the carrier element forms a type of "receptacle cage" for the locking element, i.e., only one pre-assembled holding element is required. This measure significantly simplifies the manufacture and assembly of the plug connection according to the invention. In this case, the "double locking" is essentially attained by the special holding element and very simple coupling parts. It is practical that the carrier element is essentially held stationary (positively) in the radial and/or axial direction and, in particular, centered with respect to the central axis of the plug connection in the recess, which is preferably realized in the form of an internal annular groove in the receptacle part. However, the two locking elements can be elastically deformed relative to the carrier element in the radial direction so as to cooperate with the locking edge which, in particular, is formed by an external annular groove on the plug shaft. The carrier element also causes a centering of the locking element, i.e., the plug shaft can always be easily inserted.

Figure 3:
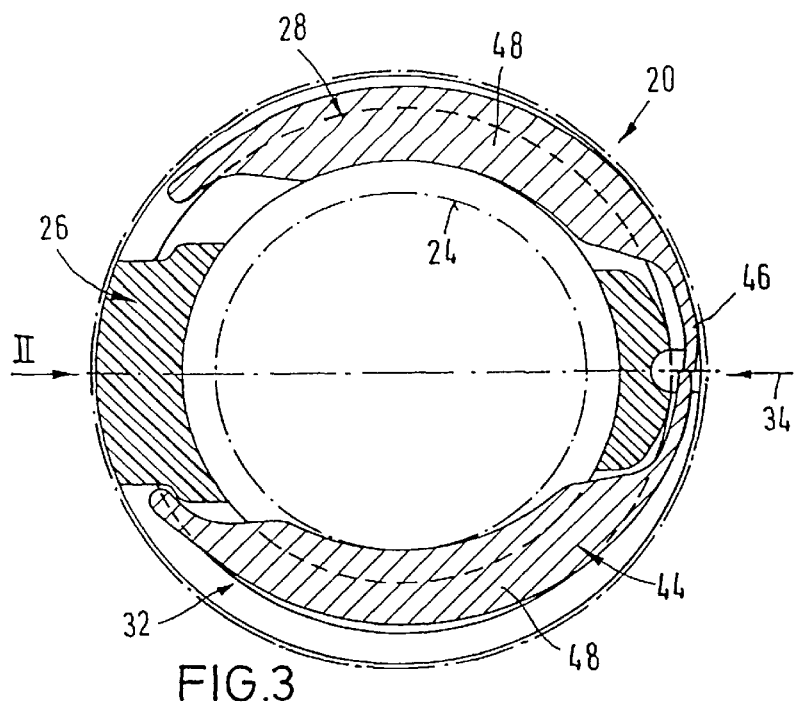
Figure 2:
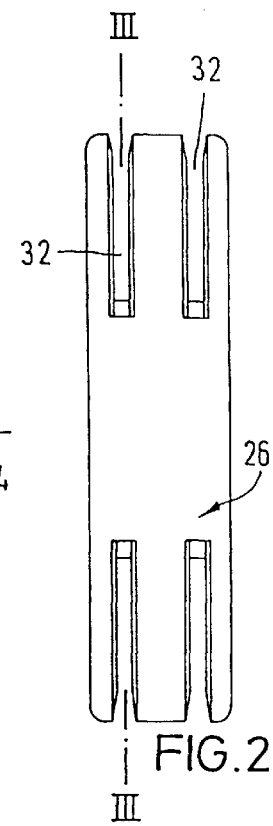
Figure 4:
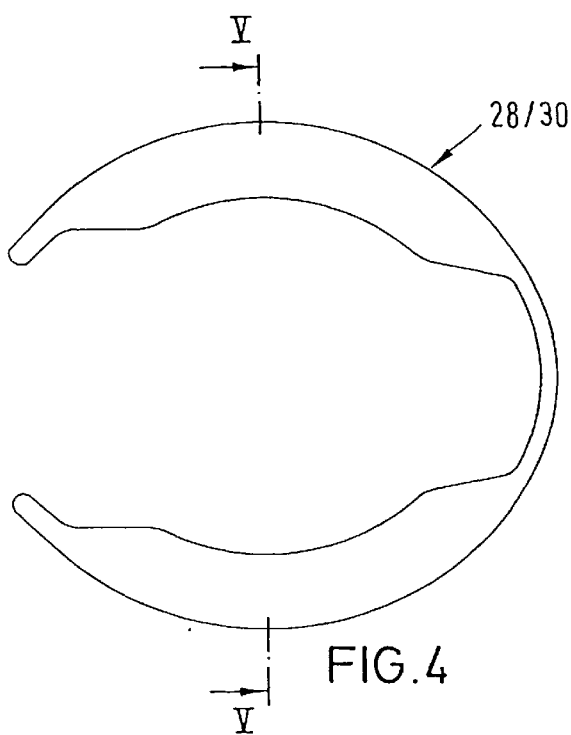
Figure 5:
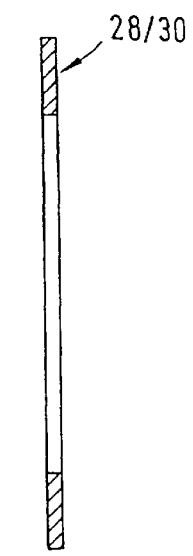
Figure 11:
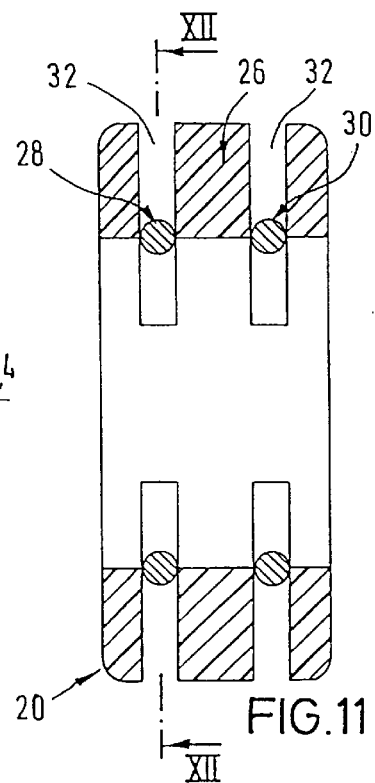
Figure 12:
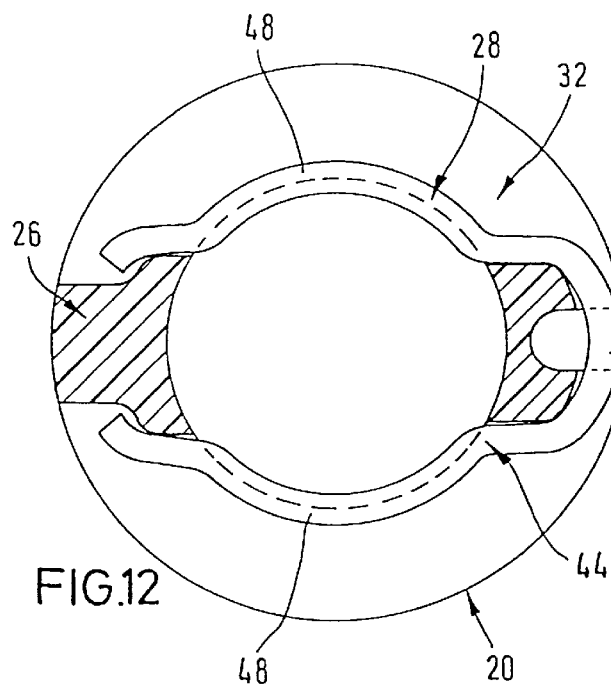
Figure 13:
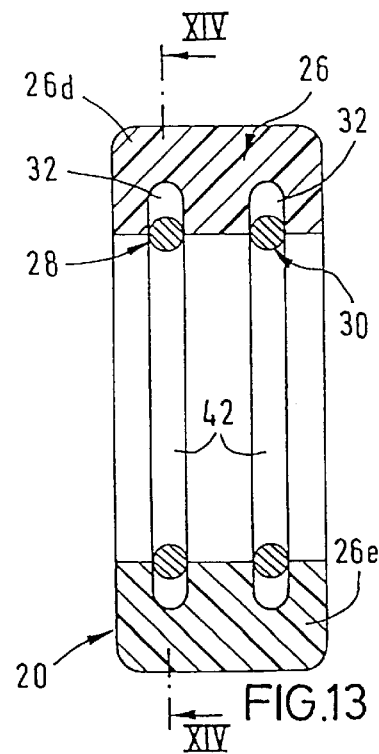
Figure 14:
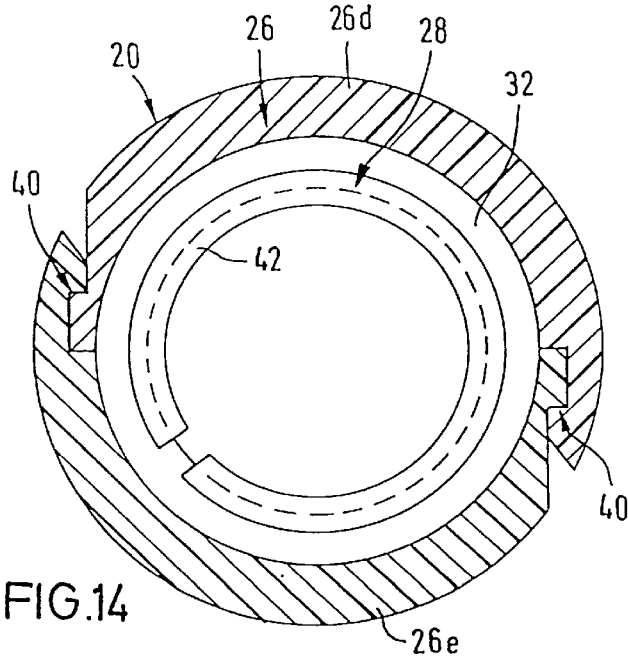

The invention is described in detail below with reference to preferred embodiments that are illustrated in the figures. The figures show:

FIGS. 1, an axial section through a plug connection according to the invention, with the left half of the figure (FIG. 1a) showing the entirely plugged full locking position and the right half of the figure (FIG. 1b) showing the partially plugged prelocking position;

FIG. 2, a side view of an individual component of the holding element according to the invention;

FIG. 3, a cross section along the plane III—III in FIG. 2 through a first embodiment of the holding element according to the invention;

FIG. 4, a top view of another individual component, i.e., an elastic locking element, of the holding element according to FIGS. 1–3;

FIG. 5, a second through the locking element along the plane V—V in FIG. 4;

FIG. 6, a second embodiment of the holding element according to the invention in the form of an exploded side view of its individual components;

FIG. 7, a top view of one component viewed in the direction of the arrow VII in FIG. 6;

FIG. 8, a top view of an additional component viewed in the direction of the arrow VIII in FIG. 6, FIG. 9, an enlarged section A-B according to FIG. 7;

FIG. 10, an enlarged section C-D according to FIG. 7;

FIG. 11, an axial section through an additional embodiment of the holding element according to the invention;

FIG. 12, a cross section through the holding element along the plane XII—XII in FIG. 11;

FIG. 13, an axial section analogous to FIG. 11 through one additional embodiment of the holding element, and FIG. 14, a cross section along the plane XIV—XIV in FIG. 13.

In all figures, identical components are always identified by the same reference symbols. Consequently, the individual components are usually described only once.

FIG. 1 shows that a plug connection according to the invention consists of two coupling parts, namely a receptacle part 2 and a plug part 4. The plug part 4 can be inserted into a receptacle opening 8 of the receptacle part 2 with a plug shaft 6 such that said plug part is sealed relative to the receptacle opening 8 by at least one circumferential seal 10. Once inserted, the plug part can be blocked from being separated by a locking device 12 (movement opposite to the inserting direction, namely, in the direction of the arrow 14). The locking device 12 is realized in such a way that a partially plugged prelocking position (FIG. 1b) and an entirely plugged full locking position (FIG. 1a) are ensured. In the prelocking position in which the plug part is already blocked from being separated in the direction of the arrow 14, an incomplete seal is produced, such that a signal, preferably an acoustically perceivable leakage noise, is generated if the plug connection is charged with pressure. In this case, the incomplete seal is limited in defined fashion or realized in the form of a "throttle gap" formed by the arrangement and/or design of the circumferential seal 10 relative to the receptacle part 2. Consequently, the pressure medium is discharged in metered fashion in the direction of the arrows 16 drawn in broken lines such that a leakage noise, in particular, a whistling, hissing or similar noise is generated. This leakage noise represents a signal that the correctly plugged full locking position is not yet attained, i.e., the plug connection can be transferred from the prelocking position into the full locking position by additionally inserting the plug part.

In the prelocking position according to FIG. 1b, it is advantageous if the circumferential seal 10 already adjoins the other coupling part at several contact points that are distributed over its circumference, preferably in the receptacle opening 8 of the receptacle part 2 as shown in the figure. Axial leakage gaps are formed between the respective contact points. This design prevents the circumferential seal 10 from being "washed out" by the compressed medium. The contact points may—as shown—be formed by a special design of the circumferential seal 10 and/or by a special design of the inner circumference of the receptacle opening 8 according to an embodiment not shown. In this respect, different design characteristics are already contained in the older, not pre-published German patent application 19,536,333.7 of Sep. 29, 1995 by the applicant, to which we hereby refer in its entirety.

In addition to the circumferential seal 10, another seal 18 may—as shown—be provided, in particular, within the region of the mouth of the receptacle opening 8. This additional seal prevents the admission of dirt, dust, moisture and the like.

The locking device 12 comprises a holding element 20 that is situated in a recess 22 of one coupling part—preferably the receptacle part 2 as shown in the figure—and respectively engages positively behind a locking edge 24 of the other coupling part—preferably the plug part 4 as shown in the figure—in the prelocking position and in the full locking position. In the preferred embodiment shown, the recess 22 is formed by an internal annular groove in the receptacle opening 8, with the locking edge 24 forming a one-sided limitation of an external annular groove on the plug shaft 6.

However, the scope of the invention also includes embodiments in which this arrangement is reversed, i.e., the holding element 20 is arranged in a recess or external annular groove on the plug shaft 6 and the locking edge 24 is arranged in the receptacle opening 8.

According to the invention, the holding element 20 is realized in such a way that it respectively cooperates with only one locking edge 24 in the prelocking position (FIG. 1b) as well as in the full locking position (FIG. 1a). This means that the holding element 20 defines the prelocking position as well as the full locking position although only one locking edge 24 is provided.

With respect to structural considerations, this is preferably attained by the fact that the holding element 20 consists of a cage-like carrier element 26 and two locking elements 28,30 that are held in the carrier element 26 axially behind one another and in elastically deformable fashion, such that the first locking element 28 engages behind the locking edge 24 in the prelocking position according to FIG. 1b and the second locking element 30 engages behind said locking edge in the full locking position according to FIG. 1a. In this case, the carrier element 26 is preferably situated in the recess 22 in the receptacle opening 8 which is preferably realized in the form of an internal annular groove.

The carrier element 26 is preferably realized in the form of an annular body with two receptacle spaces 32 for the respective locking elements 28,30.

According to FIGS. 1–3 as well as 11 and 12, the receptacle spaces 32 may be formed by recesses that are realized similar to transverse slots. In the embodiment according to FIGS. 13 and 14, the receptacle spaces 32 are formed by internal annular grooves.

It is particularly advantageous if the carrier element 26 is realized in the form of a molded part that consist of one or more components and, in particular, is manufactured of plastic. In this case, the locking elements 28,30 and the receptacle spaces 32 accommodating said locking elements may be realized in such a way that the locking elements 28,30 can be inserted into the receptacle spaces 32 from the outside, namely, transverse to the central axis of the carrier element 26 or the annular body (compare to the respective arrows 34 shown in FIGS. 3 and 12). In the embodiment according to FIGS. 13 and 14, the locking elements 28,30 are respectively realized in the form of slotted spring rings that, due to an interruption of their annular circumference, can be compressed and thus reduced in diameter in such a way that they can be axially inserted into the receptacle spaces 32 formed by annular grooves.

In the embodiments of the holding element 20 according to FIGS. 2 and 3 as well as FIGS. 11 and 12, the carrier element 26 respectively consists of a single-component molded part.

An advantageous alternative embodiment of the holding element 20 is shown in FIGS. 6–10. In this case, the carrier element 26 consists of three annular carrier parts 26a,b,c that are respectively divided in the axial direction, namely a central part 26a and two lateral parts 26b,c which are connected to one another in "sandwich-like fashion." The respective locking elements 28,30 are intermediately arranged between this sandwich-like arrangement of the carrier parts. A plug and/or snap-in connection is preferably provided for this separable connection.

In the embodiment shown, the lateral parts 26b,c respectively engage axially into corresponding plug openings 38 of the central part 26a with plug pins 36. In this case, a defined allocation can be advantageously attained by a special arrangement and/or a special cross-sectional shape of the plug pins 36 and the plug openings 38, such that the individual parts 26a,b,c can only be connected in a defined relative allocation to one another. In the embodiment shown, the plug openings 38 have different large diameters that are adapted to the corresponding plug pins 36.

In the alternative embodiment according to FIGS. 13 and 14, the carrier element 26 consists of two carrier parts 26d,e that are respectively divided in the circumferential direction and preferably form essentially semicircular carrier parts. In this case, the carrier parts 26d,e are also connected to one another, with the locking elements 28,30 being intermediately arranged between said carrier parts, namely in separable fashion, preferably by means of at least one snap-in connection (positive or non-positive snap-in connection 40).

In all embodiments, the carrier element 26 comprises two slot-like openings that, in particular, are arranged diametrically opposite to one another on at least the side that radially faces the locking edge 24. The locking elements 28,30 extend through these slot-like openings in order to engage behind the locking edge 24.

The locking elements 28,30 consist of plastic or metal, in particular, spring steel. As briefly mentioned previously, the locking elements 28,30 in the embodiment according to FIGS. 13 and 14 are formed by slotted spring rings 42, in particular, of spring wire with circular cross section. Consequently, the locking elements are realized similar to snap rings. This particular embodiment is characterized by a very simple assembly, a compact structural shape and, in the special embodiment according to FIGS. 13 and 14, a simple separation by opening the cage and subsequently removing the locking elements 28,30.

In the remaining embodiments shown, the locking elements 28,30 are respectively realized in the form of spring clamps 44 with two spring arms 48 that are integrally connected via a connecting section 46 that practically forms a spring joint. In this respect, we refer, in particular, to FIGS. 3 and 4 as well as FIG. 12. In the embodiments according to FIGS. 1–6, the spring clamps 44 are realized in the form of relatively thin punched spring steel parts. In this case, a particularly favorable, short structural length is attained despite the two locking positions. In the embodiment according to FIGS. 11 and 12, the spring clamps 44 consist of spring wire that preferably has a circular cross section. In this case, it is advantageous that the spring clamps 44 can be easily centered within the carrier element 26. In addition, the connection can be easily separated by laterally pulling apart the two parts (along the direction of the arrow 34). In this case, a very compact structural shape is attained.

At this point, it should be mentioned that any arbitrary combination of different spring rings or spring clamps may be used for the two locking elements 28,30 according to the invention.

Within the region of the spring arms 48 that cooperate with the locking edge 24, the spring clamps 44 are preferably adapted to the circumferential contour of the coupling part that comprises the locking edge 24, preferably the plug shaft 6. Consequently, the locking region of the spring arms 48 approximately has the shape of a circular arc.

FIG. 3 shows the locking element 28 or the spring clamp 44, respectively, in its "locked" position in the lower half and in the "released" position in the upper half. In this case, the locking edge 24 is indicated by a circular dot-dash line.

In order to separate the plug connection, the receptacle part 2 according to FIG. 1 consists of two parts that are connected to one another in separable fashion, namely a base part 50 and an insert part 52. In this case, the space between the two parts 50,52 defines the recess 22 that accommodates the holding element 20. Consequently, the plug shaft 6 that is locked in one of the two locking positions can be removed opposite to the direction indicated by the arrow 14 after the insert part 52 was separated from the base part 50.

In the above-mentioned alternative that, however, is not illustrated in the figures, the plug connection can be separated due to the fact that the insert part 52 forms the locking edge 24 that cooperates with the holding element 20 if the holding element 20 is arranged on the plug shaft 6. An analogous separation would be possible in this case.

The invention is not limited to the embodiments shown and described, but rather also includes all embodiments that function identically in the sense of the invention.

We claim:

1. Plug connection for pressure systems, comprising coupling parts including a receptacle part (2) having a receptacle opening (8) and a plug part (4) having a plug shaft, wherein the plug part (4) can be inserted into the receptacle opening (8) such that the plug shaft engages a circumferential seal and is blocked from being released by means of a locking device (12) configured to couple with the receptacle part at a partially plugged prelocking position and at an entirely plugged prelocking position, wherein the prelocking position produces an incomplete seal such that an acoustically perceivable leakage noise is generated if the connection is charged with a pressure medium, and wherein the receptacle part and the plug part operatively interact with the seal to produce a completely pressure-tight seal in the full locking position, and wherein one coupling part has a recess (22) and the locking device (12) comprises a holding element (20) that is situated in the recess (22), the other coupling part has one locking edge (24) behind which the holding element (20) engages, and the holding element (20) respectively cooperates with said one locking edge (24) in the prelocking position as well as in the full locking position;

the holding element (20) comprising a carrier element (26) that is situated in the recess (22) of one coupling part (2), and two locking elements (28,30) that are held axially behind one another in the carrier element (26) and are elastically deformable such that the first locking element (28) engages behind the locking edge (24) of the other coupling part (4) in the prelocking position and the second locking element (30) engages behind said locking element in the full locking position; and the carrier element (26) is realized in the form of an annular body with two slot-like receptacle spaces (32) for the locking elements (28, 30).

2. Plug connection according to claim 1, characterized by the fact that the carrier element (26) is formed by a single-component molded part with the locking elements (28, 30) and the receptacle spaces (32) being realized in such a way that the locking elements (28, 30) can be inserted into the receptacle spaces (32) transverse to the axis of the annular body.

3. Plug connection for pressure systems, comprising coupling parts including a receptacle part (2) having a receptacle opening (8) and a plug part (4) having a plug shaft, wherein the plug part (4) can be inserted into the receptacle opening (8) such that the plug shaft engages a circumferential seal and is blocked from being released by means of a locking device (12) configured to couple with the receptacle part at a partially plugged prelocking position and at an entirely plugged prelocking position, wherein the prelocking position produces an incomplete seal such that an acoustically perceivable leakage noise is generated if the connection is charged with a pressure medium, and wherein the receptacle part and the plug part operatively interact with the seal to produce a completely pressure-tight seal in the full locking position, and wherein one coupling part has a recess (22) and the locking device (12) comprises a holding element (20) that is situated in the recess (22), the other coupling part has one locking edge (24) behind which the holding element (20) engages and the holding element (20) respectively cooperates with said one locking edge (24) in the prelocking position as well as in the full locking position;

the holding element (20) comprising a carrier element (26) that is situated in the recess (22) of one coupling part (2), and two locking elements (28, 30) that are held axially behind one another in the carrier element (26) and are elastically deformable such that the first locking element (28) engages behind the locking edge (24) of the other coupling part (4) in the prelocking position and the second locking element (30) engages behind said locking element in the full locking position;

the carrier element (26) comprising three carrier parts (26a, b, c) that are divided in the axial direction, a central part (26a) and two lateral parts (26b, c) connected to one another in sandwich-like fashion, with one of said locking elements (28, 30) being intermediately arranged between the sandwich-like arrangement of carrier parts; and said carrier parts being connected in separable fashion via means providing one of a plug connection (36, 38), and a snap-in connection (26d, 26e).

4. Plug connection for pressure systems, comprising coupling parts including a receptacle part (2) having a receptacle opening (8) and a plug part (4) having a plug shaft, wherein the plug part (4) can be inserted into the receptacle opening (8) such that the plug shaft engages a circumferential seal and is blocked from being released by means of a locking device (12) configured to couple with the receptacle part at a partially plugged prelocking position and at an entirely plugged prelocking position, wherein the prelocking position produces an incomplete seal such that an acoustically perceivable leakage noise is generated if the connection is charged with a pressure medium, and wherein the receptacle part and the plug part operatively interact with the seal to produce a completely pressure-tight seal in the full locking position, and wherein one coupling part has a recess (22) and the locking device (12) comprises a holding element (20) that is situated in the recess (22), the other coupling part has one locking edge (24) behind which the holding element (20) engages and the holding element (20) respectively cooperates with said one locking edge (24) in the prelocking position as well as in the full locking position;

the holding element (20) comprising a carrier element (26) that is situated in the recess (22) of one coupling part (2), and two locking elements (28, 30) that are held axially behind one another in the carrier element (26) and are elastically deformable such that the first locking element (28) engages behind the locking edge (24) of the other coupling part (4) in the prelocking position and the second locking element (30) engages behind said locking element in the full locking position;

the carrier element (26) comprising two carrier parts (26d, e) that are divided in the circumferential direction and connected to one another, with the locking elements (28, 30) being intermediately arranged between the carrier parts; and the carrier parts being connected in separable fashion via means providing a snap-in connection (40).

5. Plug connection for pressure systems, comprising coupling parts including a receptacle part (2) having a receptacle opening (8) and a plug part (4) having a plug shaft, wherein the plug part (4) can be inserted into the receptacle opening (8) such that the plug shaft engages a circumferential seal and is blocked from being released by means of a locking device (12) configured to couple with the receptacle part at a partially plugged prelocking position and at an entirely plugged prelocking position, wherein the prelocking position produces an incomplete seal such that an acoustically perceivable leakage noise is generated if the connection is charged with a pressure medium, and wherein the receptacle part and the plug part operatively interact with the seal to produce a completely pressure-tight seal in the full locking position, and wherein one coupling part has a recess (22) and the locking device (12) comprises a holding element (20) that is situated in the recess (22), the other coupling part has one locking edge (24) behind which the holding element (20) engages and the holding element (20) respectively cooperates with said one locking edge (24) in the prelocking position as well as in the full locking position;

the holding element (20) comprising a carrier element (26) that is situated in the recess (22) of one coupling part (2), and two locking elements (28, 30) that are held axially behind one another in the carrier element (26) and are elastically deformable such that the first locking element (28) engages behind the locking edge (24) of the other coupling part (4) in the prelocking position and the second locking element (30) engages behind said locking element in the full locking position; and the carrier element (26) being provided with slot-like openings on its side that radially faces the locking edge (24), with the locking elements (28,30) extending through said slot-like openings in order to engage behind the locking edge (24).

6. Plug connection for pressure systems, comprising coupling parts including a receptacle part (2) having a receptacle opening (8) and a plug part (4) having a plug shaft, wherein the plug part (4) can be inserted into the receptacle opening (8) such that the plug shaft engages a circumferential seal and is blocked from being released by means of a locking device (12) configured to couple with the receptacle part at a partially plugged prelocking position and at an entirely plugged prelocking position, wherein the prelocking position produces an incomplete seal such that an acoustically perceivable leakage noise is generated if the connection is charged with a pressure medium, and wherein the receptacle part and the plug part operatively interact with the seal to produce a completely pressure-tight seal in the full locking position, and wherein one coupling part has a recess (22) and the locking device (12) comprises a holding element (20) that is situated in the recess (22), the other coupling part has one locking edge (24) behind which the holding element (20) engages and the holding element (20) respectively cooperates with said one locking edge (24) in the prelocking position as well as in the full locking position;

the holding element (20) comprising a carrier element (26) that is situated in the recess (22) of one coupling part (2), and two locking elements (28, 30) that are held axially behind one another in the carrier element (26) and are elastically deformable such that the first locking element (28) engages behind the locking edge (24) of the other coupling part (4) in the prelocking position and the second locking element (30) engages behind said locking element in the full locking position; and the locking elements (28, 30) are formed by slotted spring rings (42) that comprise a wire with circular cross section.

7. Plug connection for pressure systems, comprising coupling parts including a receptacle part (2) having a receptacle opening (8) and a plug part (4) having a plug shaft, wherein the plug part (4) can be inserted into the receptacle opening (8) such that the plug shaft engages circumferential seal and is blocked from being released by means of a locking device (12) configured to couple with the receptacle part at a partially plugged prelocking position and at an entirely plugged prelocking position, wherein the prelocking position produces an incomplete seal such that an acoustically perceivable leakage noise is generated if the connection is charged with a pressure medium, and wherein the receptacle part and the plug part operatively interact with the seal to produce a completely pressure-tight seal in the full locking position, and wherein one coupling part has a recess (22) and the locking device (12) comprises a holding element (20) that is situated in the recess (22), the other coupling part has one locking edge (24) behind which the holding element (20) engages and the holding element (20) respectively cooperates with said one locking edge (24) in the prelocking position as well as in the full locking position;

the holding element (20) comprising a carrier element (26) that is situated in the recess (22) of one coupling part (2), and two locking elements (28, 30) that are held axially behind one another in the carrier element (26) and are elastically deformable such that the first locking element (28) engages behind the locking edge (24) of the other coupling part (4) in the prelocking position and the second locking element (30) engages behind said locking element in the full locking position;

the locking elements (28,30) comprise spring clamps (44) with two spring arms (48) that are connected by a connecting section (46); and the spring clamps (44) comprise a wire with circular cross section.

8. Plug connection for pressure systems, comprising coupling parts including a receptacle part (2) having a receptacle opening (8) and a plug part (4) having a plug shaft, wherein the plug part (4) can be inserted into the receptacle opening (8) such that the plug shaft engages a circumferential seal and is blocked from being released by means of a locking device (12) configured to couple with the receptacle part at a partially plugged prelocking position and at an entirely plugged prelocking position, wherein the prelocking position produces an incomplete seal such that an acoustically perceivable leakage noise is generated if the connection is charged with a pressure medium, and wherein the receptacle part and the plug part operatively interact with the seal to produce a completely pressure-tight seal in the full locking position, and wherein one coupling part has a recess (22) and the locking device (12) comprises a holding element (20) that is situated in the recess (22), the other coupling part has one locking edge (24) behind which the holding element (20) engages and the holding element (20) respectively cooperates with said one locking edge (24) in the prelocking position as well as in the full locking position;

the holding element (20) is situated in the recess (22) that is formed by an internal annular groove in the receptacle opening (8) of the receptacle part (2); and the locking edge (24) is arranged on the plug shaft (6) n the form of a one-sided limiting edge of an external annular groove on the plug shaft (6).

9. Plug connection for pressure systems, comprising coupling parts including a receptacle part (2) having a receptacle opening (8) and a plug part (4) having a plug shaft, wherein the plug part (4) can be inserted into the receptacle opening (8) such that the plug shaft engages a circumferential seal and is blocked from being released by means of a locking device (12) configured to couple with the receptacle part at a partially plugged prelocking position and at an entirely plugged prelocking position, wherein the prelocking position produces an incomplete seal such that an acoustically perceivable leakage noise is generated if the connection is charged with a pressure medium, and wherein the receptacle part and the plug part operatively interact with the seal to produce a completely pressure-tight seal in the full locking position, and wherein one coupling part has a recess (22) and the locking device (12) comprises a holding element (20) that is situated in the recess (22), the other coupling part has one locking edge (24) behind which the holding element (20) engages and the holding element (20) respectively cooperates with said one locking edge (24) in the prelocking position as well as in the full locking position; and the receptacle part (2) comprises two parts (50, 52) that are connected to one another in separable fashion, with the space between said parts defining the recess (22) that accommodates the holding element (20).

10. Plug connection for pressure systems, comprising coupling parts including a receptacle part (2) having a receptacle opening (8) and a plug part (4) having a plug shaft, wherein the plug part (4) can be inserted into the receptacle opening (8) such that the plug shaft engages a circumferential sealed and is blocked from being released by means of a locking device (12) configured to couple with the receptacle part at a partially plugged prelocking position and at an entirely plugged prelocking position, wherein the prelocking position produces an incomplete seal such that an acoustically perceivable leakage noise is generated if the connection is charged with a pressure medium, and wherein the receptacle part and the plug part operatively interact with the seal to produce a completely pressure-tight seal in the full locking position, and wherein one coupling part has a recess (22) and the locking device (12) comprises a holding element (20) that is situated in the recess (22), the other coupling part has one locking edge (24) behind which the holding element (20) engages and the holding element (20) respectively cooperates with said one locking edge (24) in the prelocking position as well as in the full locking position; and the receptacle part (2) comprises two parts (50, 52) that are connected to one another in separable fashion, with one part (52) comprising the locking edge (24) that cooperates with the holding element (20) arranged on the plug shaft (6).

* * * * *